United States Patent
Lauber

(10) Patent No.: US 9,785,274 B2
(45) Date of Patent: Oct. 10, 2017

(54) INPUT DEVICE HAVING A LOWERABLE TOUCH-SENSITIVE SURFACE

(71) Applicant: Bayerische Motoren Werke Aktiengesellschaft, Munich (DE)

(72) Inventor: Felix Lauber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 93 days.

(21) Appl. No.: 14/603,448

(22) Filed: Jan. 23, 2015

(65) Prior Publication Data

US 2015/0185945 A1 Jul. 2, 2015

Related U.S. Application Data

(63) Continuation of application No. PCT/EP2013/064971, filed on Jul. 16, 2013.

(30) Foreign Application Priority Data

Jul. 25, 2012 (DE) .......... 10 2012 213 020

(51) Int. Cl.
| | |
|---|---|
| *G06F 3/041* | (2006.01) |
| *G06F 3/01* | (2006.01) |
| *G06F 3/0481* | (2013.01) |
| *G06F 3/0346* | (2013.01) |
| *G06F 3/0354* | (2013.01) |

(52) U.S. Cl.
CPC .......... *G06F 3/0414* (2013.01); *G06F 3/016* (2013.01); *G06F 3/0346* (2013.01); *G06F 3/03547* (2013.01); *G06F 3/04815* (2013.01); *G06F 2203/04105* (2013.01)

(58) Field of Classification Search
CPC .. G06F 3/0414; G06F 3/0346; G06F 3/03547; G06F 3/016; G06F 3/04815; G06F 2203/04105
See application file for complete search history.

(56) References Cited

U.S. PATENT DOCUMENTS

| | | | |
|---|---|---|---|
| 6,034,672 A | 3/2000 | Gaultier et al. | |
| 2006/0181517 A1* | 8/2006 | Zadesky | G06F 1/1613 345/173 |
| 2008/0120568 A1 | 5/2008 | Jian et al. | |

(Continued)

FOREIGN PATENT DOCUMENTS

| | | |
|---|---|---|
| DE | 201 80 024 U1 | 11/2001 |
| EP | 0 551 778 A1 | 7/1993 |

(Continued)

OTHER PUBLICATIONS

German Search Report dated Feb. 6, 2013 with partial English-language translation (Nine (9) pages).

(Continued)

*Primary Examiner* — Andrew Sasinowski
(74) *Attorney, Agent, or Firm* — Crowell & Moring LLP

(57) ABSTRACT

An input device is provided that includes a touch-sensitive surface, and an attachment structure for attaching the surface. The surface is assigned a plane, wherein the attachment structure is configured to allow a displacement of the surface along an axis perpendicular to the assigned plane. The surface can assume a first position and, by displacement, a second position that is different from the first.

17 Claims, 2 Drawing Sheets

(56) References Cited

U.S. PATENT DOCUMENTS

| | | | |
|---|---|---|---|
| 2009/0058819 A1 | 3/2009 | Gioscia et al. | |
| 2010/0253645 A1 | 10/2010 | Bolender | |
| 2010/0271320 A1* | 10/2010 | Eckl | G06F 3/017 345/173 |
| 2011/0093778 A1* | 4/2011 | Kim | G06F 3/041 715/702 |
| 2011/0128164 A1 | 6/2011 | Kang et al. | |

FOREIGN PATENT DOCUMENTS

| | | |
|---|---|---|
| EP | 1 691 263 A1 | 8/2006 |
| EP | 2 428 882 A2 | 3/2012 |
| FR | 2 937 434 A1 | 4/2010 |

OTHER PUBLICATIONS

International Search Report (PCT/ISA/210) dated Jan. 31, 2014 with English-language translation (Seven (7) pages).

* cited by examiner

INPUT DEVICE HAVING A LOWERABLE TOUCH-SENSITIVE SURFACE

CROSS REFERENCE TO RELATED APPLICATIONS

This application is a continuation of PCT International Application No. PCT/EP2013/064971, filed Jul. 16, 2013, which claims priority under 35 U.S.C. §119 from German Patent Application No. 10 2012 213 020.9, filed Jul. 25, 2012, the entire disclosures of which are herein expressly incorporated by reference.

BACKGROUND AND SUMMARY OF THE INVENTION

The invention relates to an input device having a surface that is displaceable along an axis, to a computer comprising such an input device, and to a graphical user interface having a spatial appearance.

Displays that are able to display a two-dimensional image are widely used these days. These displays frequently display graphical user interfaces in which windows are superimposed, such as in the operating systems Mac OS by Apple Inc. or Windows by Microsoft Inc. This superimposition generates the impression for the user as if the windows were arranged in front of or behind each other. In addition, displays are known which display representations in such a way that a three-dimensional spatial impression of the representation is created for a user. Such displays likewise give the user the impression of objects appearing to be in front of and behind other objects. The terms in front of and behind, or in front of and behind each other, used herein, refer both to cases in which objects (such as windows) are only displayed two-dimensionally, as described above, or to displays that generate a three-dimensional impression, as is also described above. To the user, objects located further toward the back appear to be located "deeper."

A device for entering data is known from US 2008/0120568 A1, which displays a graphical user interface on a screen and uses three-dimensional movements of a pointer. A different graphical user interface is selected as a function of the layer of space above the device that the pointer is located in. The pointer is moved on the screen so as to interact with the selected user interface. The three-dimensional position of the pointer is detected by way of two cameras.

This device not only has the drawback that a pointer is required for input, but also that the detection of the pointer is carried out by way of two cameras, which are susceptible to soiling and scratching. Moreover, the operation is not intuitive insofar as the pointer must be moved on the screen for interaction.

It is the object of the invention to overcome the above-described drawbacks of the prior art.

This and objects of the invention are achieved by an input device, comprising: a touch-sensitive surface and an attachment structure for attaching the surface, wherein the surface is assigned to a plane and the attachment structure is configured to allow a displacement of the surface along an axis perpendicular to the assigned plane. The surface assumes a first position and, by displacement, a second position that is different from the first position.

The touch-sensitive surface is configured to receive touch inputs and can be what is known as a touch pad or a touch screen, optionally even a touch-sensitive autostereoscopic display for representing three-dimensional content. The surface is displaced along or counter to a displacement direction. The surface is, in particular, flat and located in the plane assigned to the surface. The surface can thus be displaced perpendicularly to the extension thereof. In other words, the surface is retractable. Even in the case of a curved surface, the assigned plane is preferably selected so that, during displacement, the impression is created for the user as if the surface were retractable. The plane is frequently selected so as to be horizontal in the case of a fixedly installed input device.

In this way, the user is provided with a touch-sensitive surface that can take on two different positions for the user, which the user can easily associate with the concept of "depth." These different positions of the surface can, in turn, be associated with objects of a graphical user interface that are disposed in front of or behind each other. The objects of the user interface can be windows or desktops, or planes of a three-dimensional user interface. Depending on the position of the surface, a touch input can be carried out on the surface for the object associated with the position. In other words: lower positioning of the surface results in the selection of a deeper object of the user interface The touch input can be that of varying the position of the touch input on the surface, whereby the position of a pointer relative to the object (for example in a window or an associated plane) is varied.

For inputting, the user does not need a pointer, but can carry out the input with a finger, for example. In addition, no cameras are required for detecting the position of the finger; this is achieved via the touch-sensitive surface, which can be designed to be considerably more resistant to soiling or scratching. The input of objects disposed in front of or behind each other is intuitive for the user since a connection can be established between the retracted state, or in other words the depth level, of the touch-sensitive surface and the depth of the input in the user interface, or the selection of a front or rear object.

The attachment structure preferably comprises a guide, in particular a guide rail. The touch-sensitive surface can be attached to multiple points of the edges by way of the guide, in particular in a housing.

The input device advantageously further includes a position sensor, which is configured to detect whether the surface is in the first or second position. The position sensor can be a potentiometer, a Hall effect sensor, a light barrier or the like. Moreover, the position sensor can be configured to continuously detect the position of the surface and optionally associate this with a first or second position area, wherein the position areas in turn are associated with the first or second position.

The input device, and in particular the surface and the attachment structure, can generally be configured to allow the surface to assume more than two positions, for example three, four or five positions. Each of these positions can then be assigned an object of the user interface that is located further toward the front or further toward the back. The input device, and in particular the surface and the attachment structure, can likewise be configured for the surface to continuously, which is to say in a stepless manner, assume positions that, optionally, are continuously detected by the position sensor. Each detected position can then be associated with a "depth" or plane of a user interface, in particular a three-dimensional user interface. In other words, a rule exists for continuously associating the position of the surface with a "depth" or plane of a user interface.

In one refinement, the input device includes a force exerting device which exerts forces on the surface parallel to the axis, wherein the forces, in particular, can be perceived at varying levels as a function of the position of the surface. The input device can thus provide the user with counter forces or counter pressure during the displacement of the touch-sensitive surface. The exerted forces are oriented in or counter to the displacement direction. This makes it possible for forces to be exerted that are easily perceived by the person via the hand or finger, which provide the user of the input device with feedback. The force exerting device can be designed so that the forces exerted on the surface are particularly high (but not insurmountable) when the surface has assumed the first or second position. By way of these forces, the user can be provided with an indication that the surface is in the first or second position. In this case, the force is oriented counter to the displacement direction of the surface caused by the user. In some cases, a so-called lock is provided by this mechanism.

The force exerting device can include mechanical springs, an electric motor, a magnet and/or a solenoid. These are used in the manner known per se to exert the forces on the surface. In particular, the surface can also comprise magnets (solenoids), and the magnets (solenoids) of the force exerting device can be disposed (and activated) in such a way that they generate a locking position of the surface (without a fixed stop).

The force exerting device is advantageously configured to exert forces in such a way that the surface remains in the first and/or second position without forces being exerted by a user on the surface, and that the surface does not remain in the first or second position without forces being exerted by the user, wherein the force exerting device is, in particular, configured to generate locking positions for the surface.

A computer comprises: an input device as described above, having a position sensor; an electronic arithmetic unit (processor); and a display, which is configured to display a graphical user interface. The user interface generates the impression for a user as if a first object were disposed spatially in front of a second object. The electronic arithmetic unit is configured to receive the position of the surface and associate the first position of the surface with the first object and associate the second position of the surface with the second object.

In this way, the user is provided with an intuitive connection between the spatial position of the input device and the seemingly spatial position of the objects of the user interface. For example, it may be provided that a retraction of the touch-sensitive surface from a first position into a second position results in an object of the user interface that is located further toward the back, where this enables inputs/positioning of a pointer.

It may further be provided that the surface can assume a third position and that the electronic arithmetic unit is configured to associate the third position of the surface with a third object, which is disposed spatially behind the second object. It may likewise be provided that the surface can continuously assume positions that are likewise continuously associated with objects, for example the depth of a three-dimensional user interface.

The display can be a typical LCD monitor, an autostereoscopic display for three-dimensional displays, or a display having shutter glasses to be used for a three-dimensional display, but also a head-mounted display, in particular a binocular head-mounted display. The displayed objects can be windows, icons, desktops, or planes in a three-dimensional user interface. In particular, planes that are disposed behind each other in a dedicated manner can be provided in a three-dimensional user interface.

In one variant, the first position of the surface is in front of the second position of the surface for the user, or the first position of the surface is behind the second position of the surface for the user.

In one advantageous embodiment, the first object comprises an area, in particular a window, and the arithmetic unit is configured to receive the position of a touch of the surface and to associate the position of the touch with a position in the area of the first object.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
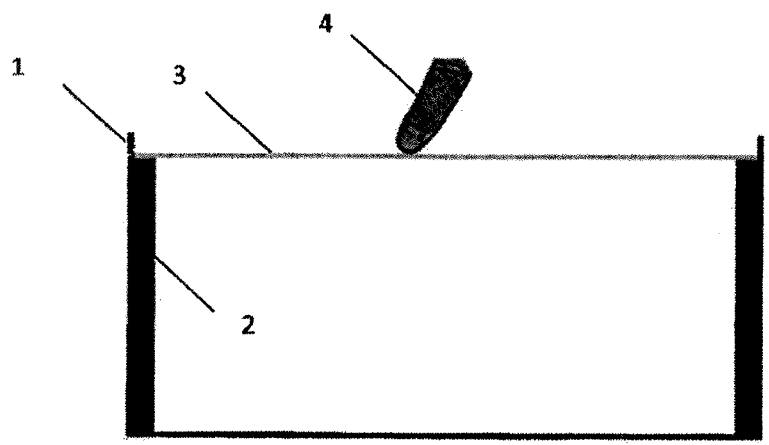
FIG. 1 shows a cross-sectional schematic view of one exemplary embodiment of an input device.

FIG. 1 shows one exemplary embodiment of an input device. It includes a housing 1, which forms a supporting structure for the input device. A rectangular touch pad 3 is attached at the corners or edges thereof to a vertical guide 2. The touch pad 3 is associated with a plane in such a way that the touch pad 3 is located in this plane. Instead of a touch pad 3, it is also contemplated to provide a touch-sensitive display.

The guide 2 provides the touch pad 3 with support and is configured to exert a force vertically upward and vertically downward. For this purpose, the guide 2 includes magnets or solenoids that are disposed on the touch pad 3, for example, and magnets or solenoids disposed in the guide 2. As an alternative or in addition, an electric motor can be disposed in the guide 2.

So as to detect the position of the touch pad 3, the guide 2 moreover includes a position sensor. In the starting state, the touch pad 3 is located almost at the uppermost edge of the housing 1. When the user presses on the touch pad 3 with a finger 4, the touch pad 3 retracts further downward into the housing 2, and more particularly perpendicularly to the plane associated with the touch pad 3, and in the present example also perpendicularly to the extension of the touch pad 3. In this way, the user is able to navigate not only in one plane, but also in the third dimension. With the aid of the guide 2 and the magnets (solenoids)/electric motors, a counter pressure/a counter force can be exerted on the touch pad 3, which makes it possible for the touch pad 3 to move upward again and out of a retracted position when a sufficiently low or no force is applied by the finger 4.

Figure 2:
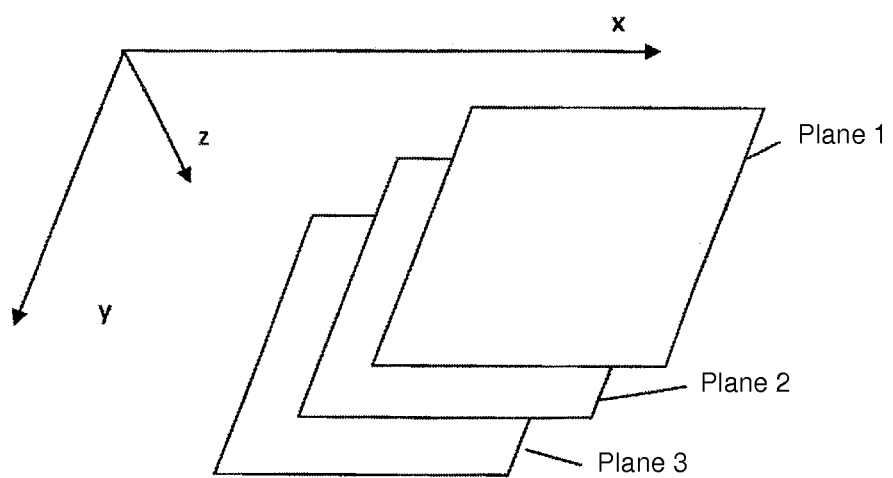
FIG. 2 shows a plane structure of a graphical user interface.

The input device is used to navigate in a dedicated plane structure or layer structure of a three-dimensional user interface as is shown in FIG. 2, and as can be displayed by an autostereoscopic display. FIG. 2 schematically shows a user interface that has a spatial appearance to the user insofar as plane 1 appears to be disposed spatially in front of plane 2, which in turn appears to be disposed spatially in front of plane 3. The arrangement of the planes in front of and behind each other is achieved by a different arrangement of the planes in the z direction. The z direction represents the "depth" of the user interface. The planes are one example of the above-mentioned objects. Windows or icons, for example, can be located inside each plane. In this application example, the user can navigate or position a pointer in each individual plane in the x/y direction by moving the finger on the touch pad 3. The user reaches a different plane by pressing the touch pad 3 into the housing 1, and thereby retracting it or allowing it to emerge upward (with the aid of magnets (solenoids)/electric motors). The guide 2 can make tactile indications available with the aid of magnets (solenoids)/electric motors when the position of the touch pad 3 corresponds to a plane of the user interface, for example by briefly locking (without stop) the touch pad 3 in the corresponding position.

FIGS. 3*a* to 3*f* show cross-sectional views of one exemplary embodiment of an input device in various states. The input device corresponds to the input device as shown in FIG. 1 and is used to navigate in different planes of a three-dimensional user interface as shown in FIG. 2.

Figure 3A:
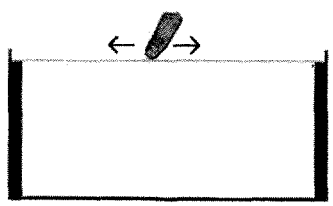
FIGS. 3a to 3f show cross-sectional schematic views of one exemplary embodiment of an input device in various states.

FIG. 3*a* shows the interaction of a finger of a user with the touch pad in the x or y direction. This interaction is used to move a pointer in plane 1 of the user interface according to FIG. 2.

Figure 3B:
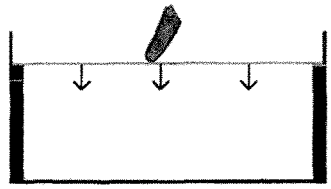

FIG. 3*b* shows how a user exerts a force or pressure on the touch pad via a finger and thereby retracts the touch pad or, in other words, pushes the same deeper into the housing. The touch pad is thus displaced from a first position into a second position. This is done perpendicularly to the plane of the touch pad, which in the present example also represents the reference plane.

Figure 3C:
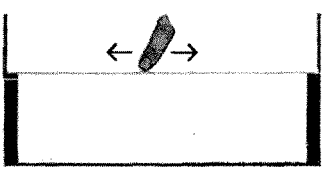

FIG. 3*c* shows how a user has reached the desired depth, or, in other words, the desired position, of the touch pad and carries out navigation inputs again in the x or y direction. The depth of the touch pad is associated with a deeper plane of a three-dimensional user interface, namely plane 2. The input device puts up resistance to the user when the associated depth has been reached, using the force exerting device. This can also be regarded as a lock. It shows the user that he has reached the next plane with the touch pad.

Figure 3D:
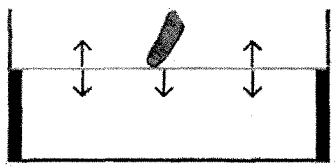

FIG. 3*d* shows how a user again varies the depth or, in more general terms, the position, of the touch pad. For this purpose he releases the lock and pushes the touch pad deeper. As an alternative, he can give in to the counter pressure, which the force exerting device can be configured to apply, which moves the touch pad upward again.

Figure 3E:
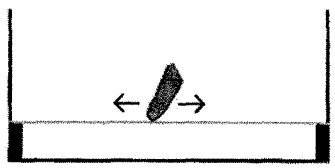

FIG. 3*e* shows how a user moves the touch pad into the third depth or, in other words, into the third position, which in turn corresponds to a plane of the three-dimensional user interface which is located further toward the back, namely plane 3. In this plane, the user now navigates a pointer.

Figure 3F:
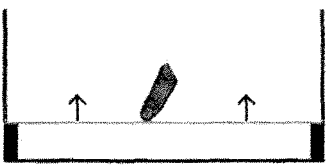

FIG. 3*f* shows how a user releases the lock of the touch pad or gives in to the counter pressure and the touch pad is moved upward again, which is to say in the rearward z direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An input device, comprising:
   a touch-sensitive surface;
   a guide rail attached to the touch sensitive surface,
   wherein the surface is assigned to a plane,
   wherein the guide rail is configured to allow a displacement of the surface by a user along an axis perpendicular to the assigned plane, whereby the surface assumes a first position and, via the displacement, a second position that is different from the first position; and
   a force exerting device configured to exert forces on the surface parallel to the axis, said forces being perceivable at varying levels as a function of the position of the surface,
   wherein the force exerting device is further configured to exert forces such that the surface remains in the first position without forces being exerted by a user on the surface and, in response to the displacement to the second position, remains in the second position without forces being exerted by the user on the surface.

2. The input device according to claim 1, further comprising:
   a position sensor configured to detect and output whether the surface is in the first position or the second position.

3. The input device according to claim 1, wherein the force exerting device is one of an electric motor, a magnet and a solenoid.

4. The input device according to claim 3, wherein the force exerting device is configured to exert forces such that the surface does not remain in the first or second position without forces being exerted by the user.

5. The input device according to claim 1, wherein the force exerting device is configured to exert forces such that the surface does not remain in the first or second position without forces being exerted by the user.

6. The input device according to claim 5, wherein the force exerting device is configured to generate locking positions for the surface.

7. The input device according to claim 1, wherein the surface is displaceable parallel to the axis by a user by exerting perceptible forces on the surface.

8. The input device according to claim 1, wherein the touch-sensitive surface is configured to detect a position of touch inputs of a user on the surface, which are used to control the position of a pointer on a display.

9. A computer, comprising:
   an input device comprising:
      a touch-sensitive surface;
      a guide rail attached to the touch sensitive surface,
      wherein the surface is assigned to a plane, and
      wherein the guide rail is configured to allow a displacement by a user of the surface along an axis perpendicular to the assigned plane, whereby the surface assumes a first position and, via the displacement, a second position that is different from the first position; and
      a force exerting device configured to exert forces on the surface parallel to the axis, said forces being perceivable at varying levels as a function of the position of the surface, and wherein the force exerting device is further configured to exert forces such that the surface remains in the first position without forces being exerted by a user on the surface and, in response to the displacement to the second position, remains in the second position without forces being exerted by the user on the surface;
   a position sensor, which is configured to detect and output whether the surface is in the first position or second position;
   an electronic arithmetic unit; and a display, which is configured to display a graphical user interface, wherein the user interface creates the impression for a user as if a first object were disposed spatially in front of a second object, wherein the electronic arithmetic unit is configured to receive the position of the surface and associate the first position of the surface with the first object and associate the second position of the surface with the second object.

10. The computer according to claim 9, wherein the first position of the surface is in front of the second position of the surface for the user, or wherein the first position of the surface is behind the second position of the surface for the user.

11. The computer according to either claim 10, wherein the first object comprises an area, and the arithmetic unit is configured to receive the position of a touch of the surface and to associate the position of the touch with a position in the area of the first object.

12. The computer according to claim 11, wherein the area is a window.

13. The computer according to claim 11, wherein the display is an autostereoscopic display or a head-mounted display.

14. The computer according to claim 9, wherein the display is an autostereoscopic display or a head-mounted display.

15. The computer according to claim 9, wherein the force exerting device is one of an electric motor, a magnet and a solenoid.

16. The computer according to claim 9, wherein, wherein the force exerting device is configured to exert forces such that the surface does not remain in the first or second position without forces being exerted by the user.

17. The computer according to claim 16, wherein the force exerting device is configured to generate locking positions for the surface.

\* \* \* \* \*